United States Patent [19]

Hestermann et al.

[11] 4,091,078

[45] May 23, 1978

[54] PRODUCTION OF PHOSPHONE

[75] Inventors: Klaus Hestermann, Erftstadt, Bliesheim; Jürgen Stengel, Erftstadt, Liblar; Gero Heymer, Erftstadt, Liblar; Christian May, Erftstadt, Liblar; all of Germany

[73] Assignee: Hoechst Aktiengesellschaft, Frankfurt am Main, Germany

[21] Appl. No.: 736,556

[22] Filed: Oct. 28, 1976

[30] Foreign Application Priority Data

Nov. 3, 1975 Germany .............................. 2549084

[51] Int. Cl.² ............................................. C01B 25/00
[52] U.S. Cl. ................................................... 423/299
[58] Field of Search .............................. 423/299, 300

[56] References Cited

U.S. PATENT DOCUMENTS

| | | | |
|---|---|---|---|
| 2,977,192 | 3/1961 | Cummins | 423/299 |
| 3,116,109 | 12/1963 | Cummins | 423/299 |
| 3,371,994 | 3/1968 | Lowe et al. | 423/299 |
| 3,375,074 | 3/1968 | Pelmer | 423/299 |
| 3,387,934 | 6/1968 | Minklei | 423/299 |

*Primary Examiner*—O. R. Vertiz
*Assistant Examiner*—Gregory Heller
*Attorney, Agent, or Firm*—Connolly and Hutz

[57] ABSTRACT

Phosphine is produced from elementary yellow phosphorus and an aqueous alkali metal hydroxide solution in the presence of an alcohol. The phosphine is more particularly made by using an alcohol having from 5 to 10 carbon atoms and a dissolving power for yellow phosphorus of more than 5 g/l; suspending the phosphorus with agitation in the said alcohol in a reaction zone; reacting the resulting suspension with the alkali metal hydroxide solution at temperatures lower than the boiling point of the alcohol; and collecting the resulting issuing gaseous phosphine.

7 Claims, No Drawings

PRODUCTION OF PHOSPHINE

The present invention relates to a process for making phosphine from elementary yellow phosphorus and an aqueous alkali metal hydroxide solution in the presence of an alcohol.

It has already been described that yellow phosphorus can be converted to finely divided red phosphorus and that the latter can be reacted at temperatures higher than 250° C with water in accordance with the following equation:

$$2 P_4 + 12 H_2O = 3 H_3PO_4 + 5 PH_3$$

to produce phosphoric acid and phosphine (cf. U.K. patent specification No. 990,918; German patent specification No. 1,219,911; and U.S. Pat. No. 3,371,994).

One of the disadvantages associated with these known processes resides in the fact that it is necessary, prior to the actual reaction, to convert yrellow to red phosphorus which inter alia causes $PH_3$ to be produced in space/time-yields as low as 3 g of $PH_3$ per liter per hour. In addition to this, the use of the above high reaction temperatures is associated with considerable expenditure of energy.

A further process for making phosphine has been described in German patent specification 1,112,722, wherein finely divided yellow phosphorus is subjected to electrolytic reduction. This is disadvantageous inasmuch as it is necessary for the anode cabinet to be separated from the cathode cabinet by means of a ceramic diaphragm which incidentally has to have the necessary chemical and mechanical strength and entails loss of electric power. This is also disadvantageous in respect of the following: At the start of the electrolysis, the phosphine contains up to 50 % $H_2$ over a period of several hours and, later during the electrolysis, about 20 % $H_2$ with equivalent loss of electric power.

A still further process for making phosphine in accordance with the following equation $$P_4 + 3 H_2O + 3 NaOH = PH_3 + 3 NaH_2PO_2$$

from yellow phosphorus and sodium hydroxide solution in a water/alcohol-medium containing at least 70 % by volume of alcohol has been described in U.S. Pat. No. 2,977,192. The alcohols used therein are methanol and ethanol. While this reaction is technically easy to carry out, the fact remains that not more than a 25 % proportion of the phosphorus used is converted to $PH_3$, corresponding to a 100 % theoretical yield, in accordance with the above equation. The mere fact that it is possible for the $NaH_2PO_2$ and $Na_2PO_3$ ($NaH_2PO_2$ + NaOH → $Na_2HPO_3$ + $H_2$) by-products to be put to practical uses would appear to justify the above reaction.

Despite this, it is highly desirable by increasing the $PH_4$-conversion rate to $PH_3$ to further improve this easy-to-handle process.

The present invention now unexpectedly provides a process for reacting yellow phosphorus with an aqueous alkali metal hydroxide solution in the presence of an alcohol, which contrary to all expectation enables more phosphorus than the theoretically possible 25 %, namely more than 30 % of the phosphorus used, to be converted to phosphine, and which comprises: using an alcohol having from 5 to 10 carbon atoms and a dissolving power for yellow phosphorus of more than 5 g/l; suspending the phosphorus with agitation in the said alcohol in a reaction zone; reacting the resulting suspension with the alkali metal hydroxide solution at temperatures lower than the boiling point of the alcohol; and collecting the resulting issuing gaseous phosphine.

The preferred solvents which are used in the process of this invention are amyl alcohol and hexanol.

It is also preferable in the present invention to use a concentrated alkali metal hydroxide solution, more preferably a 50 weight % sodium hydroxide solution. Depending on the boiling point of the alcohol used in each particular case, it is good practice to effect the reaction at temperatures of 0° to 150° C, preferably 50° to 75° C.

A further preferred feature of the present process provides for resulting residue to be separated into an alcoholic phase and aqueous phase, the former being recycled to the reaction zone.

It is also preferable to use at least one mol of alkali metal hydroxide per mol of phosphorus.

Even the use of larger quantities of alkali metal hydroxide does not impair the present process. The reaction gas which is formed in accordance with the following empirical equations:

$$P_4 + 3 H_2O + 3 NaOH = PH_3 + 3 NaH_2PO_2 \quad (a)$$

$$P_4 + 2 H_2O + 4 NaOH = 2 PH_3 + 2 Na_2HPO_3, \text{ and} \quad (b)$$

$$NaH_2PO_2 + NaOH = Na_2HPO_3 + H_2 \quad (c)$$

contains 70 to 90 % by volume of $PH_3$, 10 to 30 % by volume of $H_2$ and traces of $N_2$, if any, used for scavenging the reactor.

In the process described, 28 to 30 % of the phosphorus used undergoes conversion to $PH_3$.

The present process which is naturally not limited to the embodiments generally described herein permits the production of commercial quantities of phosphine in technically very simple manner which is associated with the high conversion rate of yellow phosphorus to phosphine of 28 to 30 % not obtainable heretofore. Phosphine is an important starting material which finds widespread uses in the phospho-organic chemistry, for making flame-retardant agents, pharmaceutical preparations, and plant protective agents.

EXAMPLE 1

950 ml of hexanol was placed in a three necked flask provided with an agitator. The air was expelled by means of nitrogen and 100 g of yellow phosphorus was added at 0° C. The temperature of 0° C was maintained and the whole was reacted with 257 g of a 50 % sodium hydroxide solution. 31.2 g of $P_3$ was set free. This corresponded to a phosphorus conversion rate of 28.4 %. The quantity of phosphine obtained was determined by converting it to phosphate. To this end, the phosphine was condensed out at −130° C, the liquid phosphine was evaporated and oxidized with a $KMnO_4$-solution.

EXAMPLE 2

The production was the same as that described in Example 1. 100 g of yellow phosphorus in 950 ml of hexanol was reacted at 100° C with 257 g of a 50 % sodium hydroxide solution. 29.9 g of $PH_3$, corresponding to a phosphorus conversion rate of 27.3 %, was obtained. The gas phase contained 70 % by volume of $PH_3$ and 30 % by volume of $H_2$.

EXAMPLE 3

A steel reactor provided with an agitator was fed with 50 liter of pentanol and 17.2 kg of yellow phosphorus was suspended therein, and the resulting suspension was admixed at 60° C with 28 liter of a 50 % sodium hydroxide solution. 5.73 kg of phosphine, corresponding to a phosphorus conversion rate of 30.4 %, was obtained. The phosphine issuing from the rector contained 16 % by volume of $H_2$.

EXAMPLE 4

A steel reactor provided with an agitator was fed with 75 liter of hexanol and 25.2 kg of yellow phosphorus was suspended therein, and the resulting suspension was admixed at 60° C with 54 liter of a 50 % sodium hydroxide solution. 8.24 kg of phosphine, corresponding to a phosphorus conversion rate of 29.8 %, was obtained. The phosphine issuing from the reactor contained 10 % by volume of $H_2$.

EXAMPLE 5

(Comparative Example)

100 g of yellow phosphorus was reacted in the manner described in Example 1 at 65° C in a mixture of 750 ml of methanol and 250 ml of water. 27.3 g of phosphine, corresponding to a phosphorus conversion rate of 24.9 % was obtained.

We claim:

1. In a process for making phosphine from elementary yellow phosphorus and an aqueous alkali metal hydroxide solution in the presence of an alcohol, the improvement which comprises: using an alcohol having from 5 to 10 carbon atoms and a dissolving power for yellow phosphorus of more than 5 g/l; suspending the phosphorus with agitation in the said alcohol in a reaction zone; reacting the resulting suspension with the alkali metal hydroxide solution at temperatures lower than the boiling point of the alcohol; and collecting the resulting issuing gaseous phosphine, the conversion rate of said phosphorus to phosphine being about 28 to 30 percent.

2. The process as claimed in claim 1, wherein the alcohol used is amyl alcohol or hexanol.

3. The process as claimed in claim 1, wherein a concentrated alkali metal hydroxide solution is used.

4. The process as claimed in claim 1, wherein the alkali metal hydroxide solution is a 50 weight% sodium hydroxide solution.

5. The process as claimed in claim 1, wherein the reaction is effected at temperatures of 0° to 150° C.

6. The process as claimed in claim 5, wherein the reaction is effected at temperatures of 50 to 75° C.

7. The process as claimed in claim 1, wherein resulting liquid reaction residue is separated into an alcoholic phase and aqueous phase, the alcoholic phase being recycled to the reaction zone.

* * * * *